Figure 1:
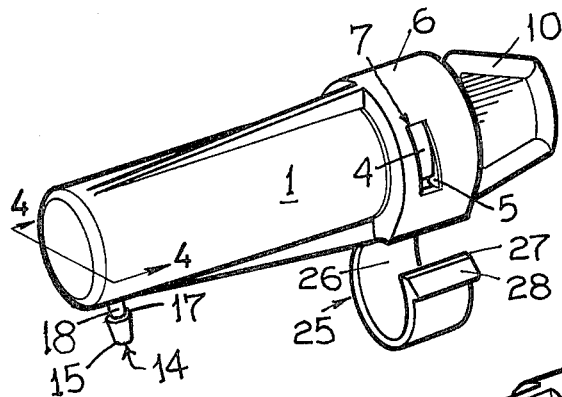

United States Patent [19]

Grosse et al.

[11] 4,092,002
[45] May 30, 1978

[54] DRIP FEED ATTACHMENT TO FEED TUBES

[75] Inventors: Barry J. Grosse, Fairview Park; Johann J. Morley, Norwood, both of Australia

[73] Assignee: Iplex Plastic Industries Pty. Ltd., Elizabeth, Australia

[21] Appl. No.: 713,099

[22] Filed: Aug. 10, 1976

[30] Foreign Application Priority Data

Oct. 17, 1975 Australia .............................. 3617/75

[51] Int. Cl.² .................................................. B05B 15/00
[52] U.S. Cl. .................................... 239/542; 239/550
[58] Field of Search ............... 239/542, 547, 550, 600; 248/231, 74 A

[56] References Cited

U.S. PATENT DOCUMENTS

| 3,729,142 | 4/1973 | Garza et al. | 239/542 X |
| 3,882,892 | 5/1975 | Menzel | 239/542 X |
| 3,885,742 | 5/1975 | Menzel | 239/547 X |
| 3,894,706 | 7/1975 | Mizusawa | 248/74 A |
| 3,897,009 | 7/1975 | Garza et al. | 239/542 |

FOREIGN PATENT DOCUMENTS

| 476,161 | 4/1929 | Germany | 248/74 A |
| 1,376,738 | 12/1974 | United Kingdom | 248/74 A |

Primary Examiner—John J. Love
Attorney, Agent, or Firm—Oldham, Oldham, Hudak & Weber Co.

[57] ABSTRACT

A drip feed attachment to feed tubes having a hollow barb-shaped inlet nipple projecting from the body adjacent a closed end to engage in an aperture in the wall of a feed tube, and a resilient hook shaped holding member on the body at its other open end which hook shaped member is aligned with the nipple and encircles the feed tube for more than half its circumference to firmly grip the feed tube and with the barbed nipple hold it to the feed tube.

3 Claims, 5 Drawing Figures

U. S. Patent     May 30, 1978     4,092,002

DRIP FEED ATTACHMENT TO FEED TUBES

This invention relates to a drip feed attachment to feed tubes.

Drip feed attachments are used in irrigation where water from a feed tube or pipeline requires to be discharged at a relatively constant rate usually at a number of points along such a feed line.

A problem existing with these devices at the present time is that they have to be attached to the line in such a way that they can maintain good sealed communciation with the inside of the line yet must be readily removable for replacement and in some cases for cleaning.

Some of the feed drip control devices are of a nature such that a removable member can be readily withdrawn from the barrel of the device to allow cleaning to take place, or alternatively the removable member is manipulated by turning or otherwise operating the member to cause cleaning of blocked passage ways, cleaning being important in that drip feed devices generally have narrow passages through which the required restriction of flow takes place.

An object of the present invention is to provide certain improvements to such a drip feed device and also to provide a form of attachment between a drip feed control device and a feed tube which will allow ready attachment of the drip feed control device to the feed tube but will allow its removal when required, and will allow the drip feed device to be cleaned without removal from the feed tube.

A further object is to ensure that even under high pressure there will be no dislodgement of the drip feed control device by the pressure exerted by the fluid.

A still further object is to so attach the device that mechanical dislodgement when the feed tube is moved will not occur.

According to this invention the object is achieved by having on or near one end of the drip feed control device a barbed nipple which is adapted to be inserted through an aperture in the feed tube and has a tapered portion which increases in diameter from its end to form a ridge on the nipple so that when the expanded portion is passed through the aperture, the ridge at the end of the expanded portion then prevents withdrawal of the nipple from the feed tube unless considerable force is applied, the drip feed control device being held in its correct orientation on the feed tube by means of a resilient hook shaped holding member which projects from the drip feed control device at or near its other end and which is so arranged that it can be clipped over the feed tube to hold, with the nipple, the drip feed control device in line with the feed tube.

The shape of the hook shaped holding member can of course be varied but generally it is formed of a relatively resilient material and has one end integral with the body and curves around to terminate near the body whereby to form an opening between the end of the hook shaped portion and the body of the drip feed control device. The hook shaped member is of a dimension such that it can be clipped over the feed tube and will firmly grip the tube, the opening between the ends of the hook shaped holding member being preferably shaped to guide the feed tube into the hollow of the hook shaped member, the free end of the hook shaped member preferably having a projection which enables the device to be readily removed from a feed tube by stressing the hook shaped member to release it.

The drip feed attachment to feed tubes, according to this invention, thus generally comprises a hollow body having its one end closed, a removable flow control member engaged in the body from an open end and shaped to form between the flow control member and the body an elongated flow path for water entering the hollow of said body at one end and discharging at the other, a hollow nipple projecting from the body adjacent its closed end and communicating with the hollow in the body, the nipple having a taper in its projecting end to form a ridge intermediate the ends of the nipple whereby to engage and hold the nipple in an aperture in the wall of a feed tube when the tapered end is moved through the wall, and a resilient hook shaped holding member on the body at its open end, and on the same side of the body as the nipple, one end of the hook shaped member being integral with the body, the hook shaped member being shaped to curve around a feed tube when engaged thereon, the free end of the hook shaped member terminating near the body to provide an opening through which a feed tube can be positioned by distorting the hook shaped member, the hook shaped member being formed about an axis which generally intersects the axis of the nipple.

Preferably the body is tapered along its axial line to be smaller at the nipple end and is open at the other larger end, and into this open end is inserted the removable member.

Figure 2:
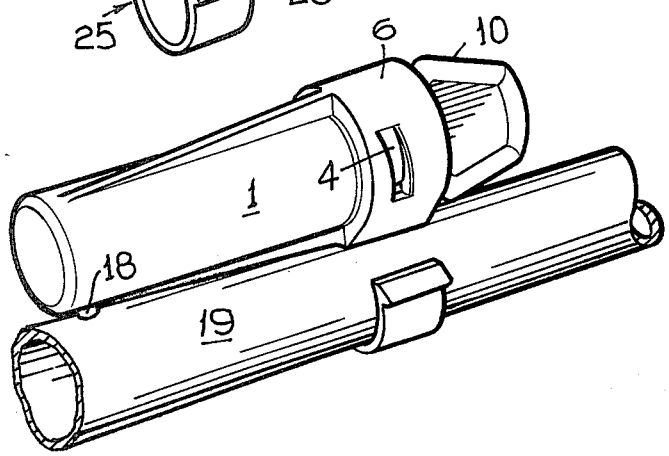
Figure 5:
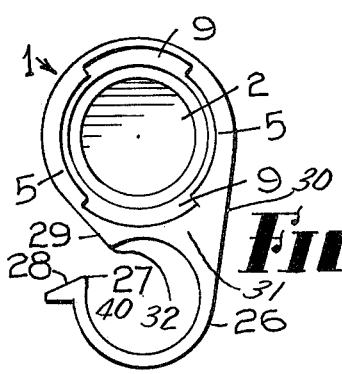
Figure 3:
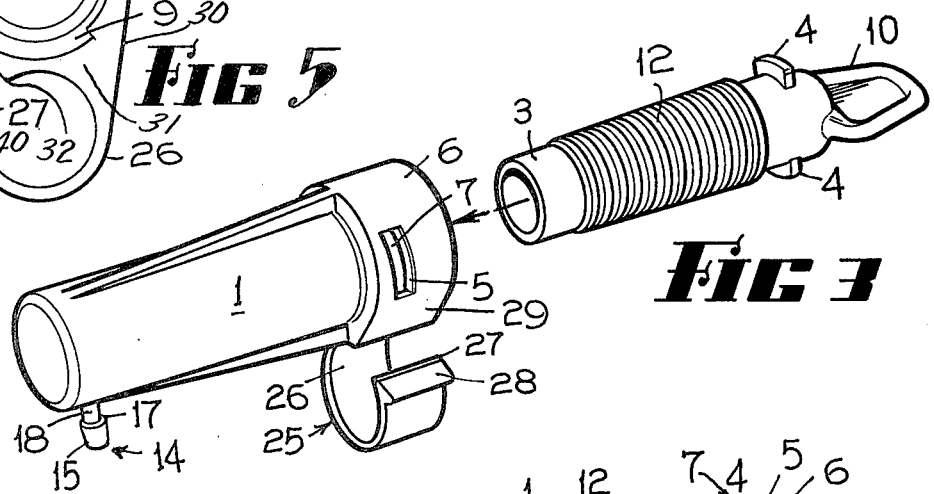
Figure 4:
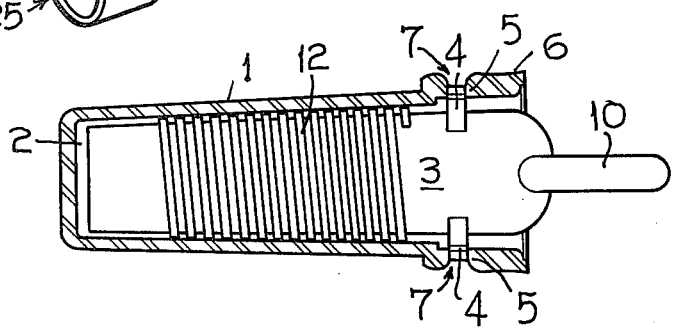

In order that the nature of the invention will be clearly understood an embodiment thereof will now be described with reference to the accompanying drawings in which:

FIG. 1 is a perspective view of a drip feed control device embodying the invention, FIG. 2 is a similar view but showing the device attached to a feed tube, FIG. 3 is a view corresponding to FIG. 1 but showing the removable member withdrawn from the body of the device, FIG. 4 is a sectional side elevation on line IV—IV of FIG. 1, only the body being shown in section, and FIG. 5 is an end elevation of the body of the device.

The body 1 has within it a hollow 2 into which the removable member 3 is inserted, the removable member 3 is inserted, the removable member 3 being held in the body by means of lugs 4 which project from the removable member and which engage behind walls 5 formed in an expanded or enlarged portion 6 of the body 1, slightly inclined slots 7 being shown in the expanded portion which project slots through into the hollow 2 of the body. The slots define the rear part of the walls 5 previously referred to. Openings 9 between the pair of walls 5 allow the lugs 4 to move to behind the walls 5 and when the removable member 3 is rotated about its axis, the lugs 4 pass behind the walls 5 and engage the faces 8 of the opening 7 to firmly lock the removable member 3 against withdrawal from the body 1. The inclination of the slots 7 is such that the removable member is forced inwards during the rotation of the member 3.

Rotation of the removable member 3 is by means of a grip 10 which extends from the removable member 3 and generally this device is known as a "key" because the removable member 3 is inserted as it were in the manner of a key into the hollow of the body 1 of the device and when turned locks the removable member 3 in position. The outer body and the "key" when assembled for use are known as the "key" clip emitter or dripper.

The removable member 3 has around its periphery within the body 1, a helical fin 12 which forms a control means for the water flow, the nipple 14 being hollow and opening into the hollow 2 of the body 1 so that water can enter one end of the body 1 through the nipple 14 and will then flow through the elongated path provided by the helical fin to discharge at the other end of the body 1, the resistance of the elongated path controlling the rate of discharge.

The outer surface of the helical fin 12 as well as the inner wall of the hollow 2 of the body 1 is slightly tapered so that when the removable member 3 is first inserted it is relatively loose but as insertion progresses the fin 12 seats against the inner surface of the body 1 to form the elongated path for the water flow.

The nipple 14 tapers from a smaller diameter at the end 15 to a larger diameter at the other end where it forms a ridge 17 where the expanded portion joins the main portion 18 of the nipple, and it will be realized that when this nipple is pushed through an aperture in the wall of a feed tube 19 a lock will occur which will only allow the nipple to be withdrawn from the feed tube by the exertion of substantial force.

The hook shaped holding member which forms the main feature of this invention is designated 25 and comprises a curved flat strip 26 which at one end forms an integral part with the body 1 and which extends around circularly to its free end 27 where is does not join the body 1 but leaves a gap through which, when the hook shaped member is distorted, the tube 19 can be inserted. The holding member 25 has a straight outer peripheral section 30 where its one end connects to the drip feed attachment and this forms a reenforcing section or web 31 on an inner portion of the holding member 25 where it connects to the drip feed attachment.

It will be noted from the drawings that in cross-section the member 25 is elongated but relatively thin and curves around through an arc of about 280° from its attachment point to the body 1, although a lesser or greater arc is possible provided it is not less than about 230°, and has its free end 27 (see FIG. 5) shaped to provide an inclined surface 28 which cooperates with the surface 29 on the body to give a lead to the space 40 within the member 25 which enables the supply line 19 to be readily pushed into position by distorting the member 25 but it will then be rigidly held by an effective encirclement of the major part of the feed tube 19. A protruding axially extending retaining rib or corner 32 is formed at the end of the surface 29 adjacent the hook member 25 to aid in engaging the supply line 19 to maintain it secured to the drip feed device. The part on which the inclined surface 28 is formed also forms a projection to allow the hook shaped member to be stressed to open the hook shaped member further to release a tube.

The method of applying the member to the feed tube should not vary, the nipple 14 is first pushed through the hose and the clip 25 then engaged on the feed tube 19.

We claim:

1. A drip feed attachment to feed tubes comprising a hollow body having within it a removable flow control member engaged in the said body from an open end shaped to form between said flow control member and said body an elongated flow path for water characterized by a combination of a hollow nipple and a resilient hook shaped holding member for placing said feed tube attachment into communication with said elongated flow path and holding said feed tube attachment to said feed tube, said hollow nipple projecting from the said drip feed attachment and communicating with the said elongated flow path, said resilient hook shaped holding member being positioned on the said drip feed attachment to lock said nipple in said aperture when engaged on said feed tube, one end of the said hook shaped member being an integral continuation of said drip feed attachment, said one end having a substantially straight outer peripheral section where said one end connects to said grip feed attachment and a reenforcing section is provided for such hook shaped member on an inner portion thereof where said straight outer peripheral section is located and said reenforcing section connects to said drip feed attachment, the free end of said hook shaped member extending an arcuate length in excess of 180° and terminating near an adjacent portion of said body to provide a restricted opening through which a feed tube can be positioned by distorting said hook shaped member, said body at the integral end of the hook shaped member and said free end of the hook shaped member both having flat surfaces inclined toward said opening to guide a feed tube into and through the opening between the free end of the hook shaped member and the adjacent portion of the said body.

2. A drip feed attachment according to claim 1 wherein the hook shaped member extends through an arc of at least 230°.

3. A drip feed attachment to feed tubes comprising a hollow body having within it a removable flow control member engaged in the said body from an open end shaped to form between said flow control member and said body an elongated flow path for water characterized by a combination of a hollow nipple and a resilient hook shaped holding member for placing said feed tube attachment into communication with said elongated flow path and holding said feed tube attachment to said feed tube, said hollow nipple projecting from the said drip feed attachment and communicating with the said elongated flow path, said resilient hook shaped holding member being positioned on the said drip feed attachment to lock said nipple in said aperture when engaged on said feed tube, one end of the said hook shaped member being an integral continuation of said drip feed attachment, said one end having a reenforcing web section where said one end connects to said grip feed attachment to reenforce said hook shaped member, the free end of said hook shaped member extending an arcuate length in excess of 230° and terminating near an adjacent portion of said body to provide a restricted opening through which a feed tube can be positioned by distorting said hook shaped member, said body at the integral end of the hook shaped member and said free end of the hook shaped member both having flat surfaces inclined toward said opening to guide a feed tube into and through the opening between the free end of the hook shaped member and the adjacent portion of the said body, and said hollow body having an axially extending retaining rib formed thereon opposed to the free end of said hook shaped member.

* * * * *